United States Patent [19]

Weber

[11] Patent Number: 4,690,253

[45] Date of Patent: Sep. 1, 1987

[54] BRAKE ACTUATOR

[75] Inventor: James L. Weber, West Bloomfield, Mich.

[73] Assignee: Rockwell International Corporation, Pittsburgh, Pa.

[21] Appl. No.: 769,526

[22] Filed: Aug. 26, 1985

[51] Int. Cl.⁴ .............................................. F16D 55/08
[52] U.S. Cl. ................................ 188/72.7; 188/71.9
[58] Field of Search ................... 188/72.7, 72.9, 72.8, 188/72.1, 71.9, 79.5 K, 106 F

[56] References Cited

U.S. PATENT DOCUMENTS

| | | | |
|---|---|---|---|
| 3,638,763 | 2/1972 | Laverdant | 188/72.7 X |
| 3,805,924 | 4/1974 | Gambardella | 188/72.7 X |
| 3,934,684 | 1/1976 | Evans | 188/72.7 X |
| 3,991,859 | 11/1976 | Coulter et al. | 188/72.7 X |
| 4,278,152 | 7/1981 | Tosi | 188/72.8 X |
| 4,399,894 | 8/1983 | Tribe | 188/71.9 |
| 4,454,933 | 6/1984 | Hunnicutt et al. | 188/72.7 X |

*Primary Examiner*—George E. A. Halvosa

[57] ABSTRACT

A brake lever is splined to an actuator shaft. A first face cam is splined to the actuator shaft and a second face cam is splined to a housing. Each face cam has plural opposed circumferentially spaced cam grooves. Rollers are positioned in the grooves. As the shaft is turned, rollers ride up the grooves in the opposite cams forcing the cams apart. The first cam is supported against axial movement in the housing by roller thrust bearings. The second cam slides along its splines pushing a piston against the force of a return spring to actuate the brake.

5 Claims, 4 Drawing Figures

BRAKE ACTUATOR

BACKGROUND OF THE INVENTION

Brake actuators have special problems. The problems are compounded in disc brake actuators in which substantial and uniform axial braking force must be applied with relatively small axial movements. The actuators must be capable of quickly applying and quickly removing braking force all with small axial movements.

At the same time, contact between the parts must be maintained so that very little movement is required before braking force is applied.

The present invention proposed solutions to the existing problems.

SUMMARY OF THE INVENTION

The present invention solves the problem of disc brake actuation uniquely by relatively turning opposed face cams with interposed rollers and supporting one face cam in a housing by thrust rollers while allowing the other face cam to slide on splines within the housing. The later axially movable face cam presses on a piston against the force of a return spring to apply brake pressures.

In a preferred embodiment, roller cam actuator apparatus moves a piston axially upon rotation of a lever at one end of the shaft. The shaft is mounted for rotation in a disc brake caliper assembly. The lever is splined to the shaft and the shaft is supported in a housing which is connected to a caliper by roller bearings. Preferably, the cam apparatus has rotor means with inward facing splines for connecting to splines on the shaft and stator means with outward facing splines for connecting to splines on the caliper-housing. The stator and rotor have opposed axial faces spaced apart at a predetermined distance. The opposed faces have complimentary cam grooves therein. Rollers are mounted between the faces and positioned in the grooves. As the rotor is turned by the shaft, the cam grooves turn the rollers and move the rollers with respect to the opposing faces of the stator and rotor. The rollers moving in the cam grooves causes the faces to separate and urge the stator and rotor axially apart. A thrust bearing on the opposite face of the rotor permits rotation of the rotor with respect to the housing. Preferably the stator slides along the splines which prevent relative rotation of the stator and housing.

As the stator slides it pushes a piston which actuates a brake. A stop washer on an end of the shaft opposite from the lever has a washer like stop. In a preferred embodiment, a compression return spring bears against the stop as an inward extension of the piston tending to axially slide the piston and the stator in the direction of the rotor.

A brake lever is moved by an conventional means, for example, mechanical means or pneumatic means such as by a brake air cylinder. Turning of the lever turns one actuator element connected to the lever and expands the actuator in an axial direction so that the actuator pushes against a piston. In a conventional manner the piston pushes against a brake pad which in turn pushes against the disc face. An opposite reaction causes the caliper in which opposing pads are mounted to move axially, squeezing the disc between two opposing pads to apply the brakes. Each of the axial movements is small. To keep the movement small, it is necessary that the brake be automatically adjusted during its use. Because the movements are small, the adjustment is difficult. The present invention uniquely provides the adjustment by mounting a clutch on the end of the actuator shaft mounting a sleeve on the end of the actuator shaft and turning the sleeve with a clutch until axial pressure of the actuator against the piston prevents turning of the sleeve. The sleeve has external splines which engage internal teeth on an inward projection on the turnable piston portion. As soon as the actuator applies brake applying force on the piston, the piston portions can no longer relatively turn, and the sleeve slips in the shaft.

The rotating portion of the piston has a relatively large gear with radially extending teeth on its outer perimeter. The gear engages a relatively small pinion on the manual brake adjuster. The manual brake adjuster includes a ratchet which prevents rotation of the pinion, and thus, prevents rotation of the gear in a direction which would tend to shorten the piston. Because of the relatively large size of the gear and the relatively small size of the pinion, a small angular rotation of the gear effects a relatively large angular rotation of the pinion which is sufficient to move the ratchet to the new locking position.

A spring on the end of the shaft tends to push the adjustable portion of the piston in the direction of the actuator. That spring has several functions, one of which is to tend to encourage the engagement of the piston with the actuator to prevent slip. Another function of the spring is the movement of the rotatable piston portion in axial direction away from the brake applying direction so that the rotatable piston portion may freely turn on threads interconnecting it to the slideable piston portion until brake applying force is applied by the actuator.

A preferred internal automatic brake adjuster for disc brakes has a shaft with first and second ends. A lever is connected to the first end of the shaft for rotating the shaft. Friction clutch means mounted on the second end of the shaft and annular spline means mounted on the second end of the shaft adjacent the friction clutch means rotate with the shaft until another force overrides the clutch and causes the spline means to slip on the shaft. A brake applying piston has first and second concentric portions which are connected by helical adjusting threads which permit relative turning of the elements in adjustment when the piston is not loaded. When brake applying force is applied to the piston, the helical threads lock the piston portions against turning. The turnable piston portion has an inward projection with teeth which engage the splined means which is mounted on the second end of the shaft. As the spline means turns with the shaft, the inward projection turns the turnable piston portion with respect to the non-turnable piston portion. The relative turning of the piston portions effects adjustment. The adjustment is prevented when actuator applies brake applying force to the piston, whereupon the spline means and friction clutch slip as the brake applying shaft is further turned.

In a preferred embodiment of the invention, the inward projection on the turnable piston portion is positioned adjacent the actuator.

In one preferred form of the invention, ratchet means is connected to the turnable portion of the piston means to prevent rotation of the turnable portion in a direction which would tend to shorten the piston means.

In a preferred form of the invention, the spline means is a collar mounted on a second end of the shaft with radially extending splines on the collar. The inward projection on the turnable piston portion is a flat circular plate which faces the actuator and which has inward projecting teeth to engage the spline means on the sleeve.

In a preferred embodiment, a washer is mounted on the second end of the shaft and a compression spring extends between a washer and the inward projecting plate to urge the plate and the piston in the direction of the actuator.

In one preferred embodiment, the friction clutch is a Belville spring positioned between the washer and the sleeve for encouraging the sleeve to rotate with the shaft, washer, and Belville spring.

In one preferred embodiment, the turnable piston portion has a large gear machined in its outer surface to engage a small pinion and a manual adjuster. The pinion is permitted to rotate in only one direction by a ratchet, which prevents rotation of the pinion and gear in a piston shortening rotation.

These and other and further objects and features of the invention are apparent in the disclosure which includes the specification with the above and ongoing description and the claims and the drawings.

DETAILED DESCRIPTION OF THE DRAWINGS

Figure 1:
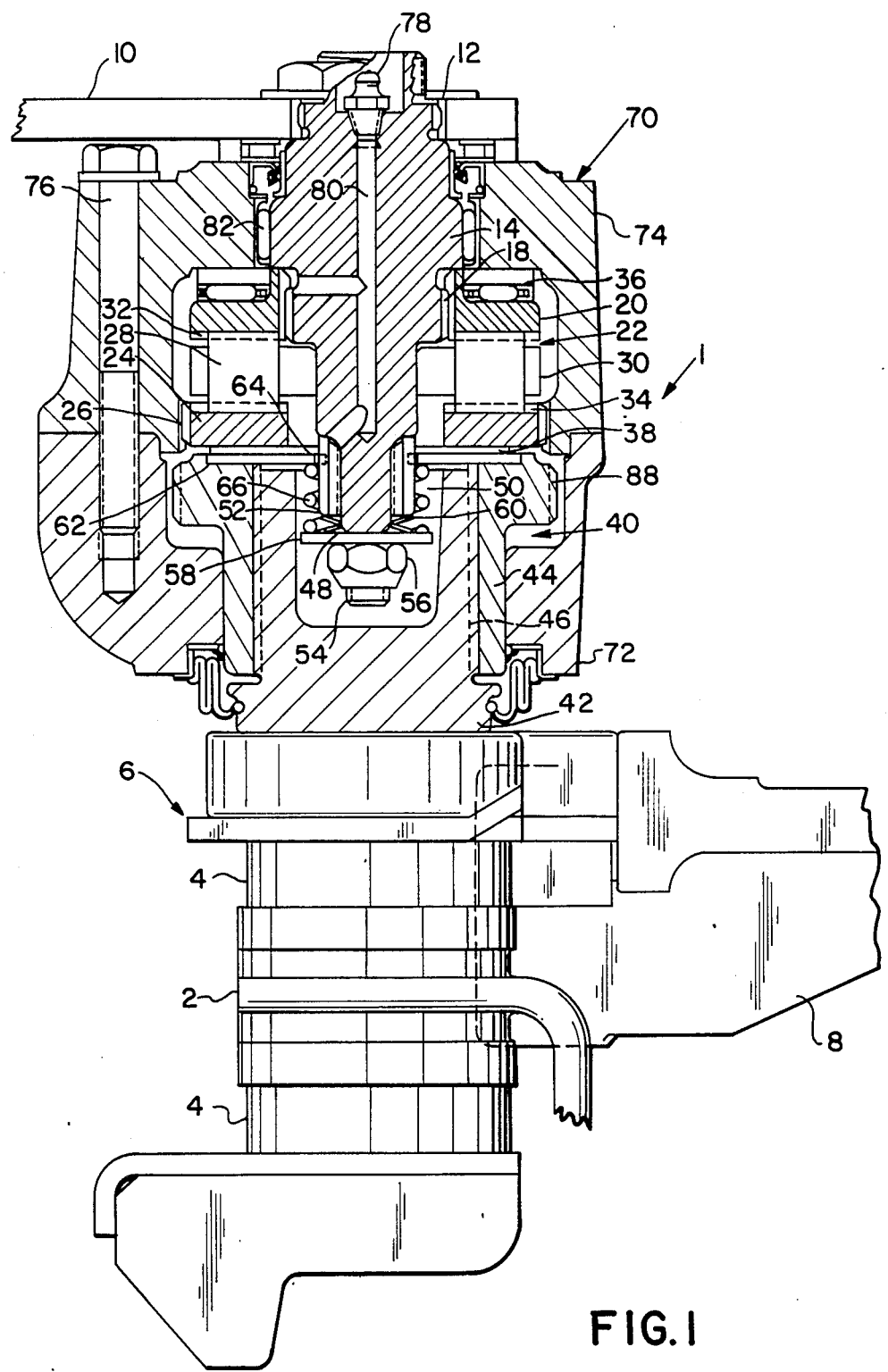
FIG. 1 is an elevational view partionally in cross section of a disc brake apparatus showing the actuator and adjusting device.

Referring to FIG. 1, a disc brake apparatus is generally referred to by the numeral 1. Disc 2 is braked by opposing pads 4 which are mounted in a caliper generally indicated by the numeral 6. The caliper assembly 6 is mounted on a spider 8.

The brake is actuated by rotating lever 10 which is splined 12 to shaft 14. Shaft 14 is splined 18 to the rotor 20 of an actuator generally indicated by the numeral 22. A stator 24 of the actuator is splined 26 to the brake housing so that the stator can not rotate as the shaft 14 is rotated. Rollers 28 are mounted in a cage 30 between the rotor 20 and the stator 24.

As lever 10 and shaft 14 rotate the rotor 20, rollers 28 ride up cam surfaces 32 and 34, which causes the rotor and stator 20 and 24 to move axially apart. Rotor 20 is supported by roller bearings 36 which prevent axial movement. Stator 24 pushes a pressure member 38 against piston 40, which tightens the caliper and squeezes brake pads 4 on opposite faces of disc 2.

Over long use, the brake pads 4 wear. The length of piston 40 is adjustable to compensate for that wear.

Piston 40 has two parts, an inner element 42 and an outer element 44 which are interconnected by adjusting threads 46. Turning the outer member 44 on inner member 42 in one direction causes the piston to elongate. Helical threads 46 have slope which locks the piston elements 42 and 44 against rotation when brake applying force is applied to the piston 40.

Shaft 14, which has splines 12 on its first end, has a second end 48 which has a reduced diameter. A splined sleeve 50 with radially directed axially extending splines 52 is mounted for rotation on the reduced shaft second end 48. The extreme second end 54 of the shaft 14 is threaded to receive a nut 56 which holds a washer 58 on the shaft. A Belville spring 60 acts as a friction clutch to encourage the collar 50 to rotate with the shaft.

Outer piston member 44 has welded thereto at its end facing the actuator 22 a inward projecting plate 62 with inward extending teeth 64 which engage the splines 52 on collar 50. As the friction clutch 60 turns the collar 50 with shaft 14, the inner projection 62 turns the outer piston member 44 on the inner piston member 42, tending to elongate the piston 40. Compression spring 66 extends between the washer 58 and the inward projection 62, tending to move the piston 40 in the direction of actuator 22 and tending to unload the threads 46 so that the piston members 44 and 42 may relatively turn. When stator 24 presses against inward projection 62 and piston member 44, the piston applying force locks threads 46, prevention further rotation of the piston members. Belville spring friction clutch 60 then permits adjusting collar 50 to remain in position while shaft 14 turns within the adjusting collar.

Figure 2:
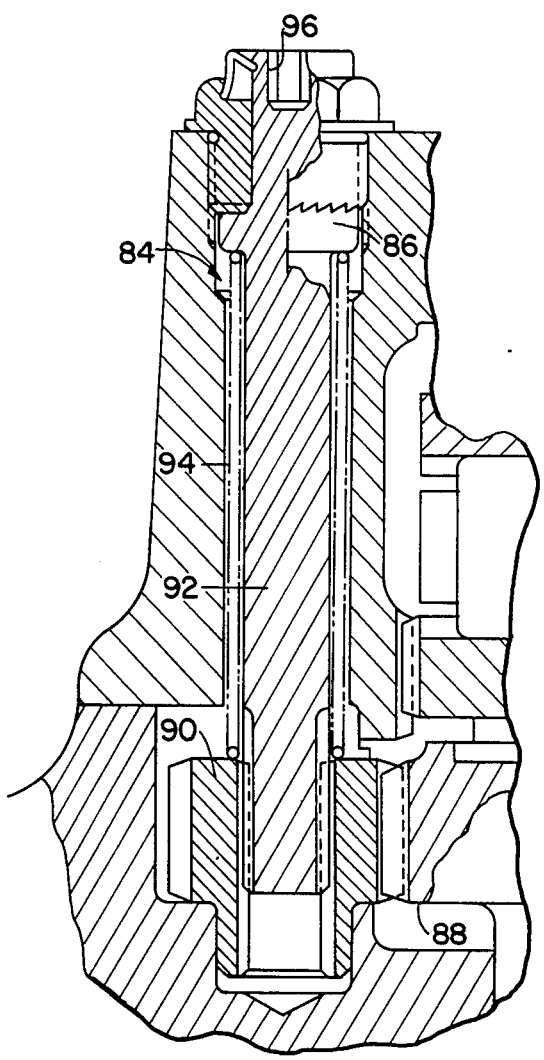
FIG. 2 is a cross-sectional detail of a manual adjuster showing a pinion and ratchet which permit adjustment of the brake only in the piston lengthening sense of rotation.

As shown in FIG. 1, the two elements 72 and 74 of the housing 70 are held together with bolts 76. Lubrication fitting 78 supplies lubricating channels 80 which in turn supply roller bearings 82 which support shaft 14 in housing 70 and which supply thrust roller bearings 36 and sleeve 50. As shown in FIG. 2, manual adjustment mechanism 84 contains a ratchet 86 which prevents relative rotation of piston member 44 on piston member 42 in a direction which would tend to shorten the piston.

As shown in FIG. 1, the piston member 44 is formed with a large outward extending gear 88, which engages a relatively small pinion 90. Pinion 90 is splined to adjusting shaft 92 which is fixed to the ratchet 86. As gear 88 turns pinion 90 in a direction which tends to elongate the piston, ratchet 86 turns to permit movement of the pinion and gear. Ratchet 86 prevents turning in the opposite sense of direction, and thus, prevents turning of pinion 90 and gear 88 in a direction which would tend to shorten the piston.

Spring 94 permits shaft 92 to move axially to release the ratchet as it is being turned. Shaft 92 may also be turned manually by inserting a wrench in socket 96.

Figure 3:
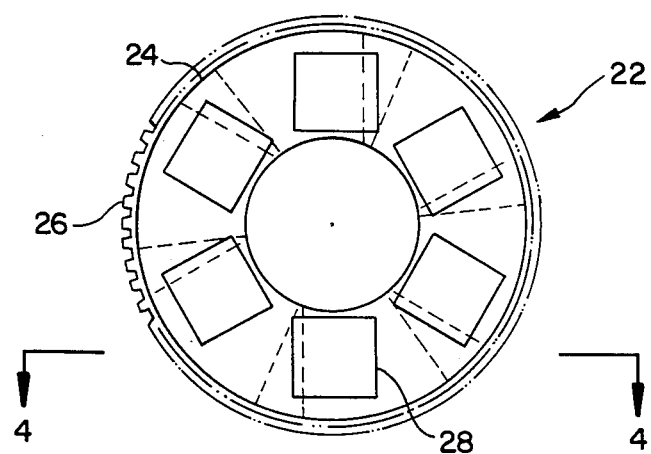
FIGS. 3 and 4 are details of the brake actuator shown in FIG. 1, FIG. 3 being taken along line 3—3 in FIG. 4 and FIG. 4 being taken along line 4—4 in FIG. 3.
Figure 4:
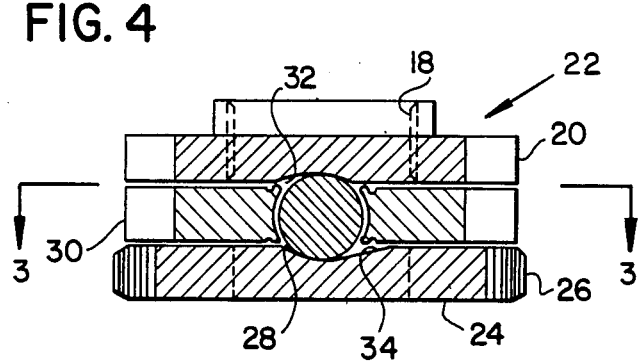

FIGS. 3 and 4 are details of the actuator 22. Rollers 28 move up cam surfaces 32 and 34 as rotor 20 is rotated with the actuator shaft by the splines 18. That movement of the rollers 28 on the cam surfaces 32 and 34 causes the stator 24 to slide axially. Splines 26 prevent rotation of stator 24.

While the invention has been described with reference to specific embodiments, modifications and variations of the invention may be constructed without departing from the scope of the invention as defined in the following claims.

What I claim is:

1. Roller cam actuator apparatus for a disc brake caliper assembly comprising a housing, a shaft in said housing mounted for rotation to said disc brake caliper assembly, a lever means connected to said shaft, means for connecting the lever means to the shaft for rotating the shaft upon rotating movement of the lever means, said connecting means including radially directed spline means connected to the shaft, said shaft having a relatively large portion near said lever means where it is mounted for rotation, roller bearing means for said shaft surrounding said large portion, rotor means in said housing having inward facing spline means for connecting the rotor means to the shaft, stator means in said housing aligned in parallel to the rotor means, means connecting the stator means to the housing to prevent relative rotation of the stator means in respect to said caliper assembly, said caliper assembly having a large central cavity, said shaft having spline means mounted thereon axially adjacent the relatively large portion of said shaft adjacent the roller bearing means rotatably mounting said rotor means thereto, said shaft being reduced in the next axial inward position adjacent the spline means, a roller mounting means being mounted on the reduced portion of said shaft, the stator means and rotor means having opposed axial faces spaced apart at a predetermined distance, the opposed faces having complementary cam grooves therein, roller means mounted between the faces and positioned in the complementary cam grooves whereby as the rotor is turned by the shaft, the cam grooves turn the roller means and move the roller means with respect to the faces, whereby the roller means moving in the cam grooves causes the faces to separate and urge the stator and rotor axially apart, bearing means on said shaft means adjacent the rotor and said roller means further comprising annular cage means having a central opening for mounting on the bearing means and further having plural rollers, retaining means for holding said plural rollers in radial alignment and for contacting the cam grooves in the opposite faces of the rotor and stator, thrust bearing means connected between the rotor means and the caliper assembly for preventing relative axial movement of the rotor and the caliper assembly said means connecting the stator means to the housing including sliding means connected between the stator means and the caliper assembly for permitting relative sliding of the stator means with respect to the caliper assembly, and pressure means in contact with the surface of the stator means for urging a piston in a brake applying direction.

2. The apparatus of claim 1 wherein the thrust bearing means is mounted in the caliper assembly to support the rotor means against axial movement and to permit the rotor means to rotate with the shaft.

3. The apparatus of claim 1 wherein the sliding means is connected to the stator to permit the stator means to slide axially with respect to the caliper assembly and wherein the stator means pushes against the piston to operate the brake.

4. The apparatus of claim 3 further comprising,
a stop means mounted on the shaft at a portion thereof remote from the lever connecting means and return spring means connected to the stop means and extending in a direction toward the lever connecting means and plate means adjacent the return spring means for pushing on the stator means and moving the stator means in a return direction toward the rotor means upon release of the brake.

5. The apparatus of claim 4 further comprising
adjusting means rotatably supported on the portion of the shaft remote from the lever connecting means,
means for connecting the adjusting means to the plate means, and
clutch means disposed between the stop means and the adjusting means, for engaging the shaft and adjusting means.

* * * * *